(12) United States Patent
Kornmann et al.

(10) Patent No.: US 11,541,315 B2
(45) Date of Patent: Jan. 3, 2023

(54) VALIDATING A PLAYER'S REAL-WORLD LOCATION USING ACTIVITY WITHIN A PARALLEL-REALITY GAME

(71) Applicant: Niantic, Inc., San Francisco, CA (US)

(72) Inventors: David Kornmann, Tucson, AZ (US); Bill Kilday, Austin, TX (US); Michael Steranka, San Francisco, CA (US); Edward Wu, Kirkland, WA (US); John Hanke, Piedmont, CA (US); Phillip Craig Keslin, San Jose, CA (US); Tatsuo Nomura, San Francisco, CA (US); Raza Ahmad, Los Angeles, CA (US); Kento Suga, Tokyo (JP); Mike Quigley, Los Altos, CA (US)

(73) Assignee: Niantic, Inc., San Francisco, CA (US)

( * ) Notice: Subject to any disclaimer, the term of this patent is extended or adjusted under 35 U.S.C. 154(b) by 0 days.

(21) Appl. No.: 16/893,248

(22) Filed: Jun. 4, 2020

(65) Prior Publication Data
US 2020/0298126 A1 Sep. 24, 2020

Related U.S. Application Data

(63) Continuation of application No. 16/041,707, filed on Jul. 20, 2018, now Pat. No. 10,717,005.

(Continued)

(51) Int. Cl.
*A63F 13/65* (2014.01)
*A63F 13/71* (2014.01)
(Continued)

(52) U.S. Cl.
CPC ............ *A63F 13/65* (2014.09); *A63F 13/216* (2014.09); *A63F 13/71* (2014.09); *A63F 13/73* (2014.09);
(Continued)

(58) Field of Classification Search
None
See application file for complete search history.

(56) References Cited

U.S. PATENT DOCUMENTS 6,530,841 B2 3/2003 Bull et al.
6,811,084 B2 11/2004 Tatsuta et al.
(Continued)

FOREIGN PATENT DOCUMENTS

CN 101553290 A 10/2009
CN 105963962 A 9/2016
(Continued)

OTHER PUBLICATIONS

Canadian Intellectual Property Administration, Office Action, CN Patent Application No. 3,069,626, dated Jan. 21, 2021, six pages.
(Continued)

*Primary Examiner* — Tramar Harper
(74) *Attorney, Agent, or Firm* — Fenwick & West LLP

(57) ABSTRACT

Systems and methods for linking real world activity, such as real world commercial activity or real world data collection activity, with a location-based parallel reality game are provided. In particular, a game server hosting a parallel reality game can modify, update, or add to game data stored in a game database associated with the parallel reality game to include certain game features in the parallel reality game linked with real world activity in the real world. The game features can be linked with activities in the real world such that player actions associated with the game features in the virtual world can lead to or encourage activity in the real world, such as commercial activity and/or data collection activity in the real world. A one-time password may be used to validate a player's location in the real world and to enable controlled access to game features in the virtual world.

14 Claims, 9 Drawing Sheets

Related U.S. Application Data

(60) Provisional application No. 62/535,863, filed on Jul. 22, 2017.

(51) Int. Cl.

| | | |
|---|---|---|
| *A63F 13/216* | (2014.01) | |
| *G06F 21/31* | (2013.01) | |
| *G06K 7/10* | (2006.01) | |
| *G06Q 30/02* | (2012.01) | |
| *A63F 13/73* | (2014.01) | |
| *G06Q 10/00* | (2012.01) | |
| *G06Q 20/32* | (2012.01) | |
| *G07F 17/32* | (2006.01) | |
| *G06Q 50/00* | (2012.01) | |
| *G06Q 30/06* | (2012.01) | |

(52) U.S. Cl.
CPC ......... *G06F 21/31* (2013.01); *G06K 7/10386* (2013.01); *G06Q 10/00* (2013.01); *G06Q 20/3224* (2013.01); *G06Q 30/02* (2013.01); *G06Q 30/0207* (2013.01); *G06Q 30/0241* (2013.01); *G06Q 30/0601* (2013.01); *G06Q 50/01* (2013.01); *G07F 17/32* (2013.01); *G07F 17/3225* (2013.01); *G07F 17/3227* (2013.01); *G07F 17/3272* (2013.01); *G07F 17/3286* (2013.01); *A63F 2300/5573* (2013.01); *A63F 2300/8082* (2013.01)

(56) References Cited

U.S. PATENT DOCUMENTS

| | | | |
|---|---|---|---|
| 7,275,994 | B2 | 10/2007 | Eck et al. |
| 7,435,179 | B1 | 10/2008 | Ford |
| 7,491,123 | B2 | 2/2009 | Smith |
| 7,564,469 | B2 | 7/2009 | Cohen |
| 7,946,919 | B2 | 5/2011 | Piccionelli |
| 7,970,749 | B2 | 6/2011 | Uhlir et al. |
| 8,002,617 | B1 | 8/2011 | Uskela et al. |
| 8,070,608 | B2 | 12/2011 | Uhlir et al. |
| 8,108,459 | B1 | 1/2012 | Hoffman et al. |
| 8,190,733 | B1 | 5/2012 | Hoffman et al. |
| 8,267,794 | B2 | 9/2012 | Van Luchene |
| 8,287,383 | B1 | 10/2012 | Etter et al. |
| 8,291,016 | B1 | 10/2012 | Whitney et al. |
| 8,308,568 | B2 | 11/2012 | Amaitis et al. |
| 8,366,446 | B2 | 2/2013 | Kreiner et al. |
| 8,794,508 | B1* | 8/2014 | Pascal .................. A63F 13/795 |
| | | | 235/375 |
| 8,827,160 | B1 | 9/2014 | Pascal et al. |
| 8,944,910 | B1 | 2/2015 | Boyle |
| 9,669,293 | B1 | 6/2017 | Kornmann et al. |
| 9,669,296 | B1* | 6/2017 | Hibbert ................ A63F 13/61 |
| 10,164,957 | B1* | 12/2018 | Saylor .................... H04L 63/08 |
| 2001/0009867 | A1 | 7/2001 | Sakaguchi et al. |
| 2002/0090985 | A1* | 7/2002 | Tochner ................ A63F 13/655 |
| | | | 463/1 |
| 2003/0036428 | A1 | 2/2003 | Aasland |
| 2003/0224855 | A1 | 12/2003 | Cunningham |
| 2004/0002843 | A1* | 1/2004 | Robarts .................. A63F 13/12 |
| | | | 703/13 |
| 2004/0029625 | A1 | 2/2004 | Annunziata |
| 2004/0058732 | A1 | 3/2004 | Piccionelli |
| 2004/0255268 | A1 | 12/2004 | Meijer et al. |
| 2005/0049022 | A1* | 3/2005 | Mullen .................. A63F 13/216 |
| | | | 463/1 |
| 2005/0272405 | A1 | 12/2005 | Tomlinson et al. |
| 2006/0105838 | A1 | 5/2006 | Mullen |
| 2006/0258420 | A1 | 11/2006 | Mullen |
| 2006/0281553 | A1 | 12/2006 | Hawkins et al. |
| 2006/0284789 | A1 | 12/2006 | Mullen |
| 2006/0287026 | A1 | 12/2006 | Mullen |
| 2007/0021166 | A1* | 1/2007 | Mattila ................ A63F 13/216 |
| | | | 463/1 |
| 2007/0060408 | A1 | 3/2007 | Schultz et al. |
| 2007/0104348 | A1 | 5/2007 | Cohen |
| 2007/0149284 | A1 | 6/2007 | Plavetich et al. |
| 2007/0265089 | A1 | 11/2007 | Robarts et al. |
| 2007/0281765 | A1 | 12/2007 | Mullen |
| 2007/0281766 | A1 | 12/2007 | Mullen |
| 2008/0015018 | A1 | 1/2008 | Mullen |
| 2008/0015024 | A1 | 1/2008 | Mullen |
| 2008/0015997 | A1 | 1/2008 | Moroney et al. |
| 2008/0039204 | A1* | 2/2008 | Ackley ................ A63F 13/79 |
| | | | 463/40 |
| 2008/0114538 | A1 | 5/2008 | Lindroos |
| 2008/0146338 | A1 | 6/2008 | Bernard et al. |
| 2009/0005140 | A1* | 1/2009 | Rose ...................... A63F 13/12 |
| | | | 463/7 |
| 2009/0017913 | A1* | 1/2009 | Bell ...................... A63F 13/216 |
| | | | 463/40 |
| 2009/0024986 | A1 | 1/2009 | Meijer et al. |
| 2009/0281851 | A1 | 11/2009 | Newton et al. |
| 2010/0287011 | A1 | 11/2010 | Muchkaev |
| 2010/0331089 | A1 | 12/2010 | Priebatsch et al. |
| 2011/0004658 | A1 | 1/2011 | Chesley et al. |
| 2011/0081973 | A1* | 4/2011 | Hall ...................... A63F 13/216 |
| | | | 463/42 |
| 2011/0238473 | A1 | 9/2011 | Sankolli et al. |
| 2011/0252464 | A1* | 10/2011 | Sanjeev ................ H04L 63/107 |
| | | | 726/7 |
| 2011/0319148 | A1* | 12/2011 | Kinnebrew ............ A63F 13/65 |
| | | | 463/1 |
| 2012/0010938 | A1* | 1/2012 | Standley ................ G06Q 30/02 |
| | | | 705/14.1 |
| 2012/0040745 | A1 | 2/2012 | Auterio et al. |
| 2012/0052953 | A1 | 3/2012 | Annambhotla et al. |
| 2012/0094770 | A1 | 4/2012 | Hall |
| 2012/0142429 | A1 | 6/2012 | Muller |
| 2012/0157197 | A1* | 6/2012 | Watkins, Jr. ............ A63F 13/79 |
| | | | 463/30 |
| 2012/0157210 | A1 | 6/2012 | Hall |
| 2012/0185892 | A1 | 7/2012 | Camplejohn et al. |
| 2012/0190452 | A1 | 7/2012 | Weston et al. |
| 2012/0214571 | A1* | 8/2012 | Oakes ...................... G07F 17/32 |
| | | | 463/17 |
| 2012/0226627 | A1 | 9/2012 | Yang |
| 2012/0231887 | A1* | 9/2012 | Lee ...................... A63F 13/217 |
| | | | 463/39 |
| 2012/0233258 | A1 | 9/2012 | Vijayaraghavan et al. |
| 2012/0244945 | A1 | 9/2012 | Kolo et al. |
| 2012/0246104 | A1 | 9/2012 | Di Sciullo et al. |
| 2012/0253488 | A1 | 10/2012 | Shaw et al. |
| 2012/0315992 | A1 | 12/2012 | Gerson et al. |
| 2013/0004932 | A1 | 1/2013 | Mahajan et al. |
| 2013/0005466 | A1 | 1/2013 | Mahajan et al. |
| 2013/0005475 | A1 | 1/2013 | Mahajan et al. |
| 2013/0005480 | A1 | 1/2013 | Bethke et al. |
| 2013/0072308 | A1 | 3/2013 | Peck et al. |
| 2013/0103760 | A1* | 4/2013 | Golding ................ H04L 67/22 |
| | | | 709/204 |
| 2013/0117326 | A1 | 5/2013 | De Smet et al. |
| 2013/0130779 | A1* | 5/2013 | Gagner ................ G07F 17/3267 |
| | | | 463/25 |
| 2013/0178257 | A1 | 7/2013 | Langseth |
| 2014/0057725 | A1* | 2/2014 | Mahajan ................ A63F 13/798 |
| | | | 463/42 |
| 2014/0278946 | A1 | 9/2014 | Powell et al. |
| 2015/0089607 | A1* | 3/2015 | Hubner ................ H04L 63/0838 |
| | | | 726/6 |

FOREIGN PATENT DOCUMENTS

| | | |
|---|---|---|
| EP | 1574238 A1 | 9/2005 |
| EP | 2101889 A1 | 9/2009 |
| EP | 2393056 A1 | 12/2011 |
| EP | 2416289 A1 | 2/2012 |
| GB | 2467113 A | 7/2010 |
| JP | 2001-273565 A | 10/2001 |
| JP | 2003-006721 A | 1/2003 |
| JP | 2008-073265 A | 4/2008 |
| JP | 2012-050775 A | 3/2012 |

(56) References Cited

FOREIGN PATENT DOCUMENTS

| JP | 2013-240579 A | 12/2013 |
|---|---|---|
| JP | 2014-041492 A | 3/2014 |
| JP | 2014-144350 A | 8/2014 |
| JP | 2015-533540 A | 11/2015 |
| WO | WO 2002/062436 A2 | 8/2002 |
| WO | WO 2008/076764 A1 | 6/2008 |
| WO | WO 2010/119866 A1 | 10/2012 |
| WO | WO 2014/055279 A1 | 4/2014 |

OTHER PUBLICATIONS

Empire Avenue, "About Empire Avenue", Date Unknown, one page. [Online] [Retrieved Jul. 31, 2013] Retrieved from the internet <www.empireavenue.com/abouV>.

International Search Report and Written Opinion, PCT Application No. PCT/IB2018/055443, dated Nov. 27, 2018, 9 pages.

klout.com, "Klout Score", Date Unknown, four pages. [Online] [Retrieved Apr. 1, 2013] Retrieved from the internet <http://klout.com/corp/klout.score>.

Matyas, S., "Playful Geospatial Data Acquisition by Location-based Gaming Communities", The International Journal of Virtual Reality, 2007, vol. 6. No. 3, pp. 1-10.

United States Office Action, U.S. Appl. No. 13/955,077, dated Oct. 21, 2016, 16 pages.

United States Office Action, U.S. Appl. No. 15/586,129, dated Apr. 17, 2019, 20 pages.

United States Office Action, U.S. Appl. No. 15/586,129, dated Aug. 13, 2019, 22 pages.

European Patent Office, Extended European Search Report and Opinion, EP Patent Application No. 18838456.4, dated Sep. 18, 2020, ten pages.

Japan Patent Office, Notice of Reasons for Refusal, JP Patent Application No. 2020-524935, dated Aug. 11, 2020, six pages.

United States Office Action, U.S. Appl. No. 16/041,707, dated Dec. 27, 2019, 14 pages.

Canadian Intellectual Property Office, Office Action, CA Patent Application No. 3,069,626, dated Jul. 27, 2021, seven pages.

Korean Intellectual Property Administration, Office Action, KR Patent Application No. 10-2021-7002898, dated Nov. 18, 2021, 22 pages.

European Patent Office, Examination Report, European Patent Application No. 18838456.4, dated Mar. 4, 2022, six pages.

Raoul, N. "How do Location-Based Apps Avoid Getting Cheated by Emulated GPS?" Information Security Stack Exchange, Aug. 12, 2014, 5 pages, [Online] [Retrieved Jul. 25, 2022], Retrieved from the Internet <URL:https://security.stackexchange.com/questions/65181/how-do-location-based-apps-avoid-getting-cheated-by-emulated-gps>.

Japan Patent Office, Office Action, JP Patent Application No. 2021-104650, dated Aug. 23, 2022, six pages.

* cited by examiner

VALIDATING A PLAYER'S REAL-WORLD LOCATION USING ACTIVITY WITHIN A PARALLEL-REALITY GAME

CROSS-REFERENCE TO RELATED APPLICATIONS

This application is a continuation of co-pending U.S. patent application Ser. No. 16/041,707 filed on Jul. 20, 2018, which claims the benefit of U.S. Provisional Patent Application 62/535,863 filed on Jul. 22, 2017; both of which are incorporated by reference.

FIELD

The present disclosure relates generally to location-based gaming, and more particularly, to a system and method for validating a player's real-world location based on activity within a parallel reality game.

BACKGROUND

A parallel reality game providing a shared virtual world that parallels at least a portion of the real world can host a variety of interactions that can attract a community of players. Providing a virtual world with a geography that parallels at least a portion of the real world allows players to navigate the virtual world by navigating the real world. Linking virtual elements in the virtual environment with real world objects, locations, and actions in the real world can encourage players to travel to and notice features in the real world that the players would normally ignore. Providing virtual elements in the same location in the virtual world as their counterpart real world objects and/or locations in the real world increases the feeling that virtual elements are hidden parts of the real world.

A parallel reality game can include game features that encourage players to interact in the virtual world, such as through social interactions with other players in the virtual world and through various game objectives in the virtual world. Certain game features can be provided to more closely link the parallel virtual world with the real world. A parallel reality game can also include game features that encourage players to interact simultaneously in the real world and the virtual world, for example by coming together in a defined geographic area in the real world at a particular time and date, and while together in the real world interacting with each other as well in the virtual world.

Technology exists that enables individuals to cause a computing device to report its location as being different than its true location, commonly referred to as "spoofing" the device's location. Players who use such technology in playing parallel reality games are similarly referred to as "spoofers." These players can cause problems in these games because spoofing a device's location enables access to features and events that are intended to be limited a specific real-world location without physically being at that location. This may cause players who make the effort to go to the real-world location to feel disheartened and may give the spoofers an unfair advantage in the game over players who play the game as intended. Spoofing may also reduce the desirability of the parallel reality game to advertisers and sponsors as spoofers need not visit any specific physical location while playing the game. For example, there is little value to a coffee shop in Vermont in appearing to a player in the game who is physically located in California and spoofing their device's location to make it appear like they are located in Vermont.

SUMMARY

The above and other problems may be addressed by using player activity within a location-based parallel reality to game to validate the player's real-world location. On interacting with or coming in proximity to a location or object in the virtual world, the player's client device may validate that it is located at or near the corresponding real-world location using information available in the real world. This information may be specific to the player or shared across a group of players (e.g., all players on a team, all players from a particular geographic area, all players worldwide, etc.).

In one embodiment, a computer-implemented method for providing access-controlled content in a parallel reality game includes providing game data to a client device. The game data includes a virtual-world location of an access point that corresponds to a real-world location. The method also includes receiving a request to access the controlled content that includes a one-time password and indicates the client device is in proximity to the real-world location corresponding to the access point. The method further includes validating the request to access the controlled content based on the one-time password and providing the access-controlled content to the client device (assuming the request is validated).

Other exemplary implementations of the present disclosure are directed to systems, apparatus, non-transitory computer-readable media, devices, and user interfaces for validating a player's a player's real-world location based on activity in a location-based parallel reality game.

Aspects and advantages of various embodiments are described in the following description. Additional aspects and advantages may be apparent to one of skill in the art based on the description or may become apparent through practice of the embodiments. The accompanying drawings, which are incorporated in and constitute a part of this specification, illustrate various embodiments and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
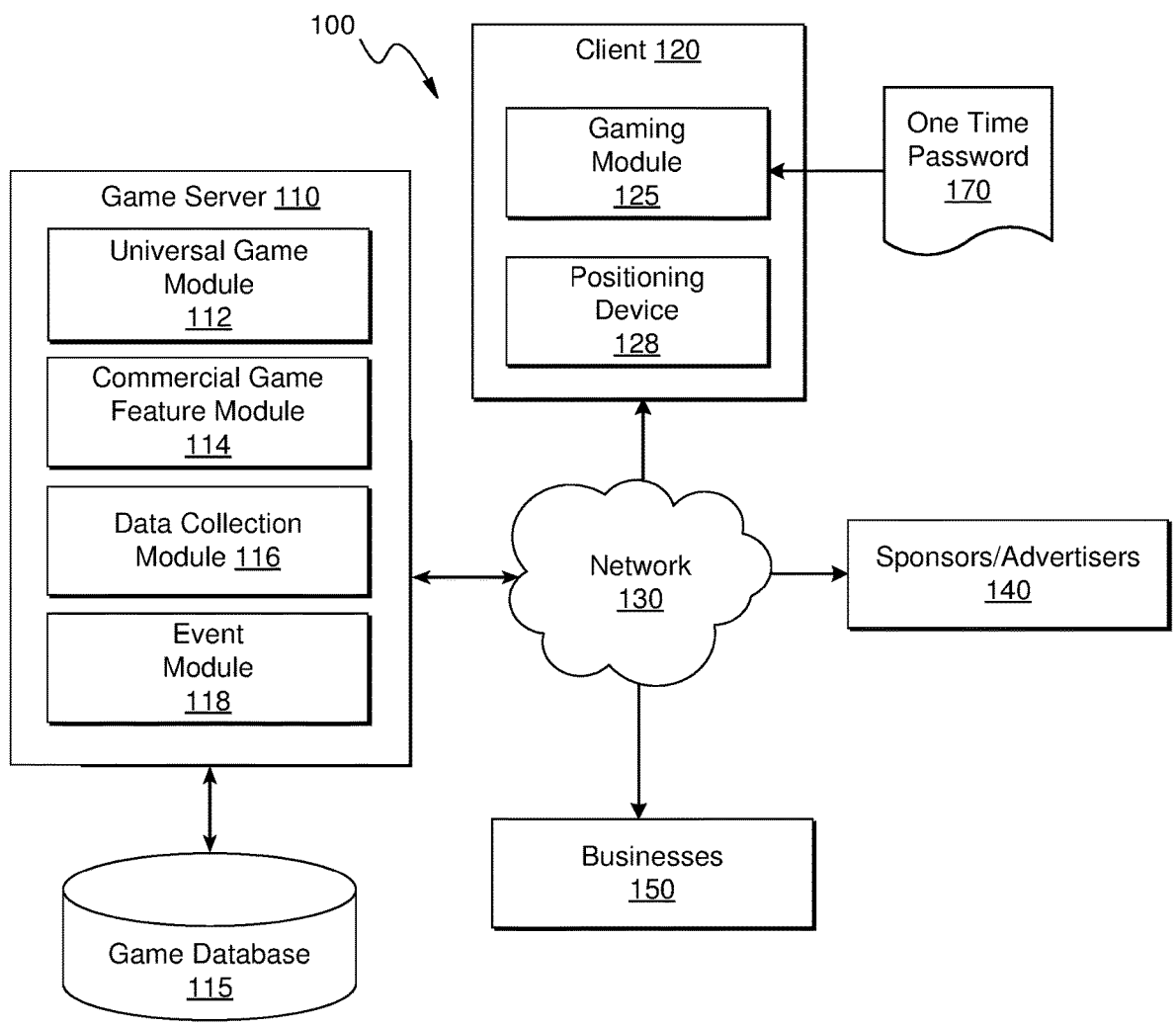
FIG. 1 is a block diagram of a networked computing environment in which a player's real-world location may be validated based on activity within a parallel reality game, according to one embodiment.

Reference now will be made in detail to various embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the invention. For instance, features illustrated or described as part of one embodiment can be used with another embodiment. Thus, it is intended that the present disclosure cover such modifications and variations.

Overview

A game server can host a parallel reality game having a player gaming area that includes a virtual environment with a geography that parallels at least a portion of the real world geography. Players can navigate a range of coordinates defining a virtual space in the virtual world by navigating a range of geographic coordinates in the real world. In particular, the positions of players can be monitored or tracked using, for instance, a positioning system (e.g. a GPS system) associated with a player's mobile device. Player position information can be provided to a game server hosting the parallel reality game over a network and can be used by the game server hosting the parallel reality game to update player locations in the virtual world. As a result, as the player continuously moves about in a range of coordinates in the real world, the player also continuously moves about in a range of coordinates in the parallel virtual world.

The virtual world can include one or more virtual elements that are linked with real world landmarks/locations. For instance, the virtual world can include various virtual elements associated with landmarks, museums, works of art, libraries, or other areas of interest in the real world. The virtual elements linked with real world landmarks/locations can provide the illusion that the virtual world is a hidden dimension of the real world that a player can interact with by playing the parallel reality game. For instance, as players navigate geographic coordinates in the real world, the players can discover and interact with virtual elements provided in the parallel virtual world. Various game objectives can require players to interact with these virtual elements as part of the parallel reality game.

To improve the link between the real world and the parallel virtual world, certain game features can be linked with real world activity, such as real world commercial activity and/or real world data collection activity, to enhance the impact actions in the virtual world have on actions in the real world and vice versa, improving the user experience in the parallel reality game. Game features linked with commercial activity in the real world can be included in the parallel reality game such that player actions while playing the parallel reality game can encourage or incentivize commercial activity in the real world. Sponsors, advertises, businesses, and other entities can request certain game features to be included in the parallel reality game to increase the exposure of the business or other entity to players of the parallel reality game.

The game server hosting the parallel reality game can modify, update, or add to game data stored in a game database associated with the parallel reality game to include certain game features in the parallel reality game. Access-controlled game features can be included that are available only to players who meet certain criteria (e.g., ticket holders for a special event at specified location and time, players who have participated in a particular promotional offer, players who completed specified in-game tasks, or any other definable group). For instance, the game features can be linked with activities in the real world such that player actions associated with the game features in the virtual world can lead to or encourage commercial activity and/or data collection activity in the real world.

As described previously, it may be desirable to ensure that spoofers do not gain access to access-controlled game features. Consequently, when a player requests access to an access-controlled game feature, additional steps may be taken to validate that the player is in fact at the corresponding real-world location. Using in-game activity to validate real-world location according to aspects of the present disclosure can have a technical effect of improving location determination technology. It may also have the technical effect of further enhancing the link between the parallel virtual world and the real world.

Exemplary Location-Based Parallel Reality Gaming System

A parallel reality game is a location-based game having a virtual world geography that parallels at least a portion of the real world geography such that player movement and actions in the real world affect actions in the virtual world and vice versa. Those of ordinary skill in the art, using the disclosures provided herein, will understand that the subject matter described is applicable in other situations where validating the location of a user is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

FIG. 1 illustrates one embodiment of a networked computing environment 100 in which a player's real-world location may be validated based on activity within a parallel reality game. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 120 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the location of the virtual element in the virtual world. For convenience, various embodiments are described with reference to "the player's location" but one of skill in the art will appreciate that such references may refer to the location of the player's client device 120.

Figure 2:
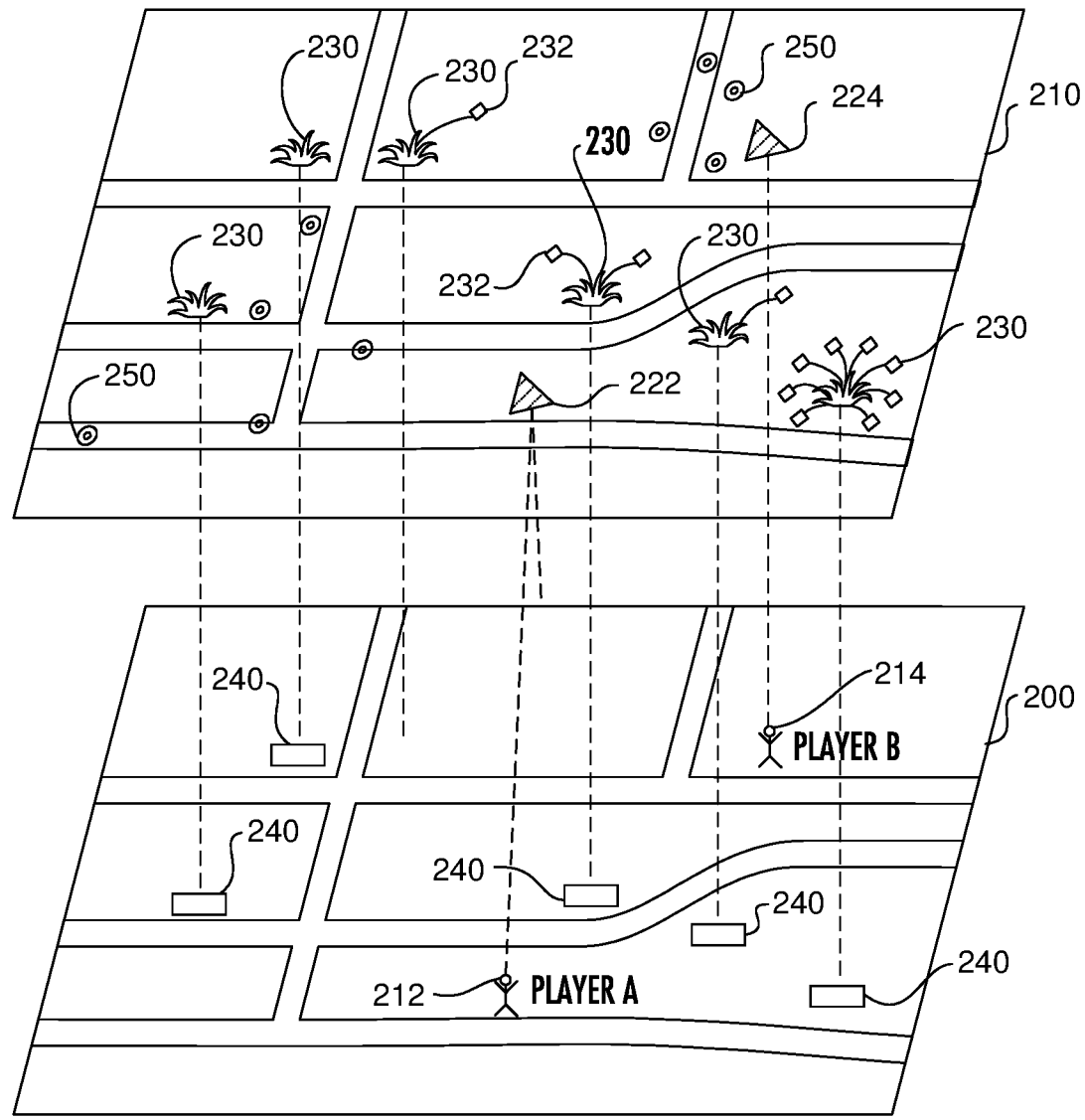
FIG. 2 depicts a representation of a virtual world having a geography that parallels the real world, according to one embodiment.

FIG. 2 depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system associated with a mobile device carried by the player (e.g. a GPS system) can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, a game objective can require players to capture or claim ownership of virtual elements 230 located at various virtual locations in the virtual world 210. These virtual elements 230 can be linked to landmarks, geographic locations, or objects 240 in the real world 200. The real world landmarks or objects 240 can be works of art, monuments, buildings, businesses, libraries, museums, or other suitable real world landmarks or objects. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives may require that players use one or more virtual items that are collected by the players in the location-based game. For instance, the players may travel the virtual world seeking virtual items (e.g. weapons, creatures, power ups, or other items) that can be useful for completing game objectives. These virtual items can be found or collected by traveling to different locations in the real world or by completing various actions in either the virtual world or the real world. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams.

The parallel reality game can have various features to enhance and encourage game play within the parallel reality game. For instance, players can accumulate a virtual currency or another virtual reward that can be used throughout the game (e.g., to purchase in-game items). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Referring back FIG. 1, the networked computing environment 100 uses a client-server architecture, where a game server 110 communicates with one or more clients 120 over a network 130 to provide a parallel reality game to players at the clients. The networked computing environment also includes sponsor/advertiser systems 140 and business systems 150. Although only one client 120, sponsor/advertiser 140, and business 150 are illustrated in FIG. 1, any number of each can be connected to the game server 110 over the network 130. Furthermore, the networked computing environment 100 may contain different or additional elements and functionality may be distributed between the clients 120 and the server 110 in a different manner than described below.

The game server 110 can be any computing device and can include one or more processors and one or more computer-readable media. The computer-readable media can store instructions which cause the processor to perform operations. The game server 110 can include or can be in communication with a game database 115. The game database 115 stores game data used in the parallel reality game to be served or provided to the client(s) 120 over the network 130.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators and/or by data received from users/players of the system 100, such as from one or more clients 120 over the network 130.

The game server 110 can be configured to receive requests for game data from one or more clients 120 (for instance via remote procedure calls (RPCs)) and to respond to those requests via the network 130. For instance, the game server 110 can encode game data in one or more data files and provide the data files to the client 120. In addition, the game server 110 can be configured to receive game data (e.g. player positions, player actions, player input, etc.) from one or more clients 120 via the network 130. For instance, the client device 120 can be configured to periodically send player input and other updates to the game server 110, which the game server 110 uses to update game data in the game database 115 to reflect any and all changed conditions for the game.

In the embodiment shown, the server 110 includes a universal gaming module 112, a commercial game feature module 114, a data collection module 116, and an event module 118. The game server 110 interacts with a game database 115 that may be part of the game server 110 or accessed remotely (e.g., the game database 115 may be a distributed database accessed via the network 130). In other embodiments, the game server 110 contains different and/or additional elements. In addition, the functions may be distributed among the elements in a different manner than described. For instance, the game database 115 can be integrated into the game server 110.

The universal game module 112 hosts the parallel reality game for all players and acts as the authoritative source for the current status of the parallel reality game for all players. The universal game module 112 receives game data from clients 120 (e.g. player input, player position, player actions, landmark information, etc.) and incorporates the game data received into the overall parallel reality game for all players of the parallel reality game. The universal game module 112 can also manage the delivery of game data to the clients 120 over the network 130.

The commercial game feature module 114, in embodiments where one is include, can be separate from or a part of the universal game module 112. The commercial game feature module 114 can manage the inclusion of various game features within the parallel reality game that are linked with a commercial activity in the real world. For instance, the commercial game feature module 114 can receive requests from sponsors/advertisers 140, businesses 150, or other entities over network 130 (via a network interface) to include game features linked with commercial activity in the parallel reality game. The commercial game feature module 114 can then arrange for the inclusion of these game features in the parallel reality game. Embodiments of the commercial game feature module 114 are described in greater detail below, with reference to FIG. 5.

The game server 110 can further include a data collection module 116. The data collection module 116, in embodiments where one is included, can be separate from or a part of the universal game module 112. The data collection module 116 can manage the inclusion of various game features within the parallel reality game that are linked with a data collection activity in the real world. For instance, the data collection module 116 can modify game data stored in the game database 115 to include game features linked with data collection activity in the parallel reality game. The data collection module 116 can also analyze and data collected by players pursuant to the data collection activity and provide the data for access by various platforms. Various embodiments of the data collection module 116 are described in greater detail below, with reference to FIG. 6.

The event module 118 manages player access to events in the parallel reality game. Although the term event is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game. Various embodiments of the event module 118 are described in greater detail below, with reference to FIGS. 7 through 9.

A client 120 can be any portable computing device that can be used by a player to interface with the gaming system 100. For instance, a client 120 can be a wireless device, a personal digital assistant (PDA), portable gaming device, cellular phone, smart phone, tablet, navigation system, handheld GPS system, wearable computing device, a display having one or more processors, or other such device. In short, a client 120 can be any computer-device or system that can enable a player to interact with the game system 100.

The client 120 can include one or more processors and one or more computer-readable media. The computer-readable media can store instructions which cause the processor to perform operations. The client 120 can include various input/output devices for providing and receiving information from a player, such as a display screen, touch screen, touch pad, data entry keys, speakers, and/or a microphone suitable for voice recognition. The client 120 can further include a network interface for providing communications over the network 130. A network interface can include any suitable components for interfacing with one more networks, including for example, transmitters, receivers, ports, controllers, antennas, or other suitable components.

Because the networked computing environment 100 provides a location-based game, the client 120 is preferably a portable computing device that can be easily carried or otherwise transported with a player, such as a smartphone or tablet. In the embodiment shown in FIG. 1, each client 120 includes a gaming module 125 and a positioning module 128. The client 120 is also shown as receiving a one-time password (OTP) 170. The OTP 170 may provide access to access-controlled game content (e.g., special events hosted at specific real-world location at specified times). The OTP 170 may be obtained by scanning a QR code, typing the password into the client (e.g., using an on-screen keyboard), or other appropriate forms of user input. The OTP 170 may also be obtained automatically or semi-automatically by one or more sensors of the client 120, such as from an electromagnetic signal (e.g., emitted from a Bluetooth beacon), an audio signal (e.g., emitted by a speaker), or the like. In other embodiments, the clients 120 may include different or additional elements.

In another embodiment, the OTP 170 is generated by the server 110 and provided to the client 120 via the network 130. Alternatively, the OTP 170 may be generated by a sponsor/advertiser 140 or business 150 (e.g., as a reward to the player for making a purchase) and sent to both the player's client 120 for use and to the server 110 so that the game provider knows the OTP is valid for gaining access to corresponding game content. In either case, a representation of the OTP 170 (e.g., a 2D barcode) may be displayed by the client 120 and scanned by a scanner in the real world (e.g., in a store or check in booth at an event) to gain access to in-game content associated with the real-world location of the scanner. Because the game provider may have direct or indirect control of the scanner, this may provide strong validation of the player's location. In other embodiments, the client 120 may represent the OTP 170 in other ways, such as transmitting it encoded in a Bluetooth signal, encoding it in an audio signal, encoding it in an infrared signal, or using any other appropriate method to communicate the OTP to a scanner or other device used to verify the OTP.

The gaming module provides a player with an interface to participate in the parallel reality game. The game server 110 transmits game data over the network 130 to the client 120 for use by the gaming module 125 at the client 120 to provide local versions of the game to players at locations remote from the game server 110. The server 110 can include a network interface for providing communications over the network 130. A network interface can include any suitable components for interfacing with one more networks, including for example, transmitters, receivers, ports, controllers, antennas, or other suitable components.

The gaming module 125 executed by the client 120 provides an interface between a player and the parallel reality game. The gaming module 125 can present a user interface on a display device associated with the client 120 that displays a virtual world (e.g. renders imagery of the virtual world) associated with the game and allows a user to interact in the virtual world to perform various game objectives. The gaming module 125 can also control various other outputs to allow a player to interact with the game without requiring the player to view a display screen. For instance, the gaming module 125 can control various audio, vibratory, or other notifications that allow the player to play the game without looking at the display screen. The gaming module 125 can access game data received from the game server 110 to provide an accurate representation of the game to the user. The gaming module 125 can receive and process player input and provide updates to the game server 110 over the network 130.

The positioning device 128 can be any device or circuitry for monitoring the position of the client 120. For example, the positioning device 128 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position.

As the player moves around with the client 120 in the real world, the positioning device 128 tracks the position of the player and provides the player position information to the gaming module 125. The gaming module 125 updates the player position in the virtual world associated with the game based on the actual position of the player in the real world. Thus, a player can interact with the virtual world simply by carrying or transporting the client 120 in the real world. In particular, the location of the player in the virtual world can correspond to the location of the player in the real world. The gaming module 125 can provide player position information to the game server 110 over the network 130 such that the universal gaming module 112 keeps track of all player positions throughout the game. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
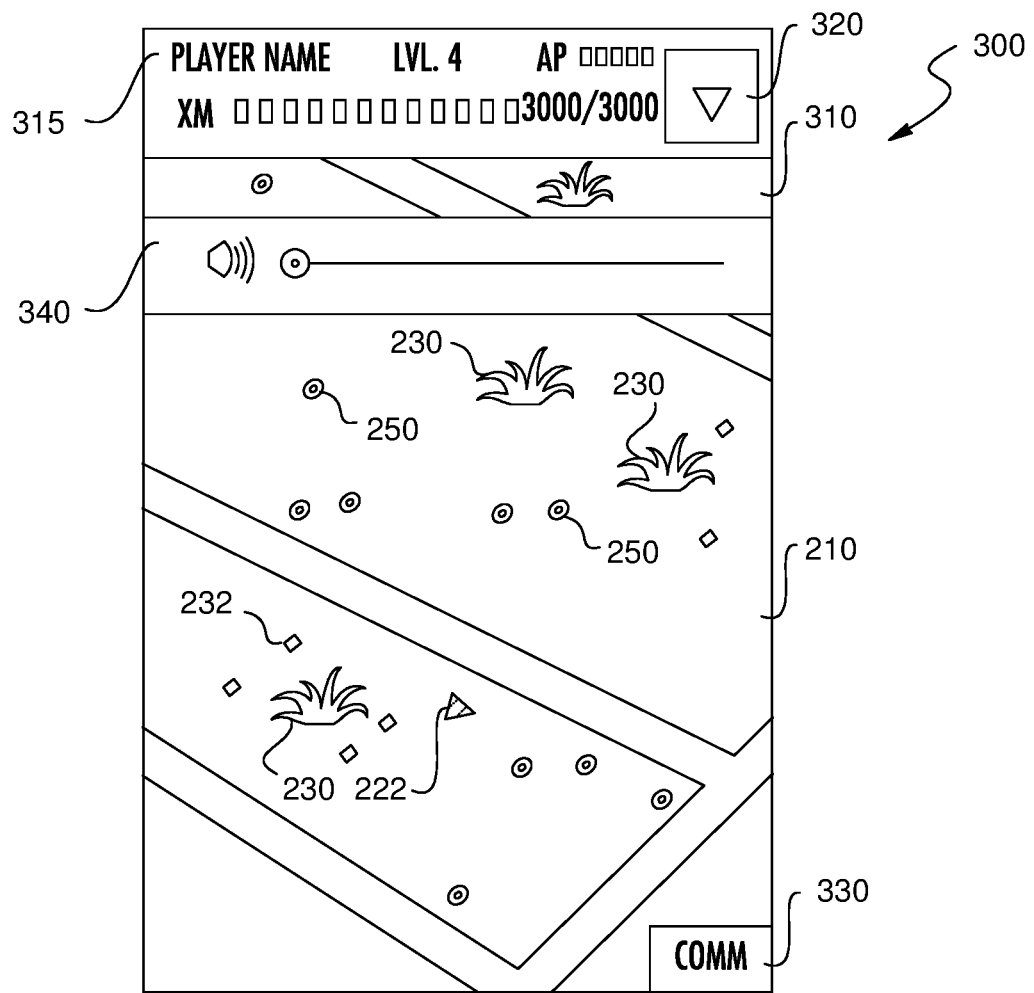
FIG. 3 depicts an exemplary game interface of a parallel reality game, according to one embodiment.

FIG. 3 depicts one embodiment of a game interface 300 that can be presented on a display of a client 120 as part of the interface between a player and the virtual world 210. The game interface 300 includes a display window 310 that can be used to display the virtual world 210 and various other aspects of the game, such as player position 222 and the locations of virtual elements 230, virtual items 232 and virtual energy 250 in the virtual world 210. The user interface 300 can also display other information, such as game data information, game communications, player information, and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the parallel reality game.

According to aspects of the present disclosure, a player can interact with the parallel reality game by simply carrying a client device 120 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location based game. As a result, the user interface 300 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Exemplary Client-Server Flow Diagram

Figure 4:
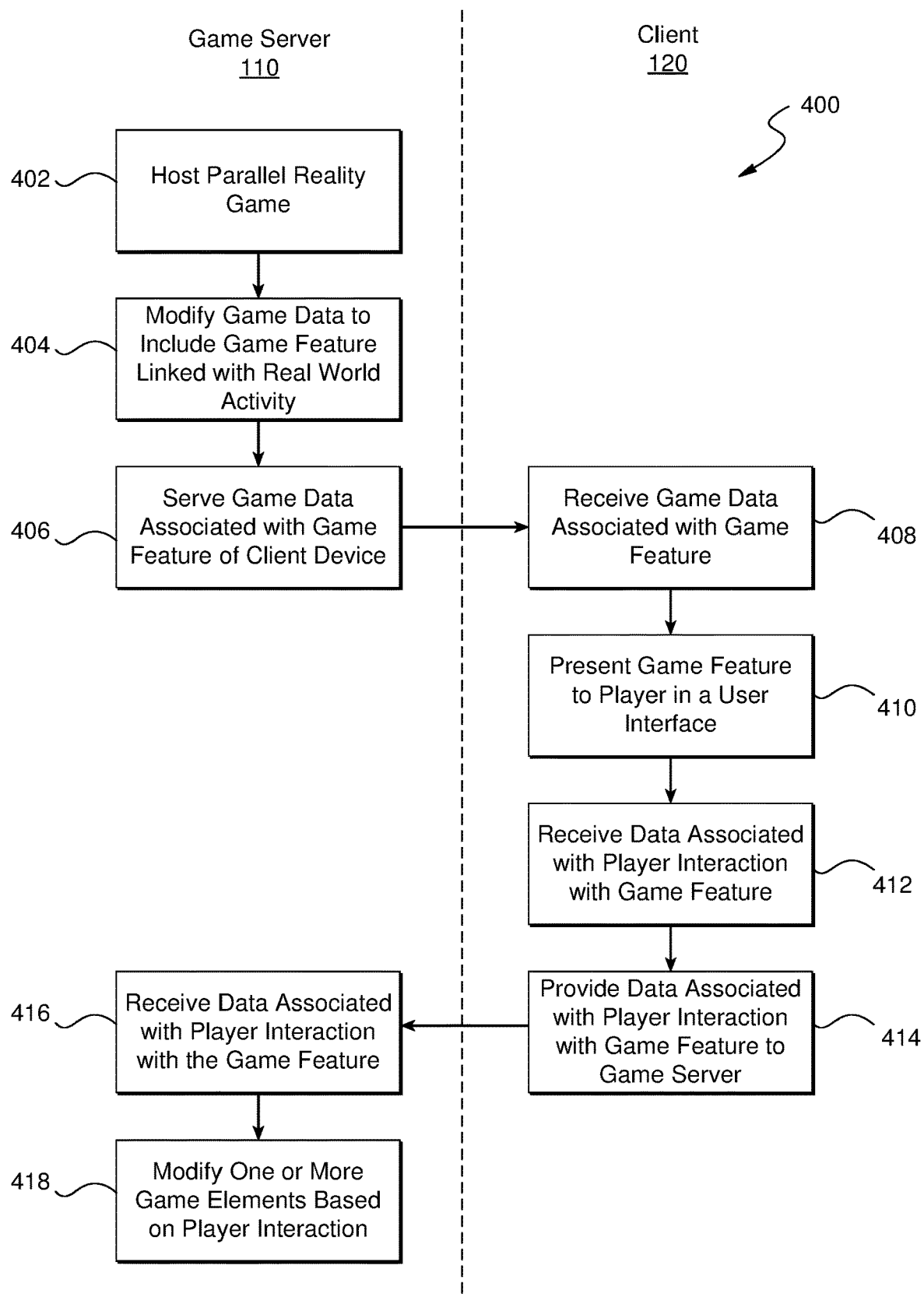
FIG. 4 is a server-client interaction diagram of a method for linking real world activity with a parallel reality game, according to one embodiment.

FIG. 4 depicts a client-server flow diagram of a method 400 for linking real world activity with a parallel reality game, according to one embodiment. The method 400 can be implemented using any suitable computing system, such as the client-server arrangement of the system 100 of FIG. 1. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. The methods may also include different or additional steps.

In the embodiment shown in FIG. 4, the method 400 begins at 402 with a server hosting the parallel reality game for a plurality of client devices. For instance, the game server 110 can host the parallel reality game for a plurality of client devices 120 over the network 130. Players can access the parallel reality game by communicating with the game server 110 over the network 130 via one or more client devices 120. In this manner, the game server 110 may act as an authoritative source of events for the parallel reality game.

At 404, the server can modify game data associated with the parallel reality game to include a game feature linked with a real world activity in the game. For instance, the game server 110 can modify, update, or add game data to the game database 115 such that a game feature linked with a real world activity is included in the parallel reality game. A game feature linked with a real world activity can be any game feature designed to incentivize or encourage activity by players in the real world, including activities in the real world not directly related to the overall game objective for the parallel reality game. In particular embodiments, the game feature linked with a real world activity can be a game feature linked with a commercial activity in the real world or a game feature linked with a data collection activity in the real world. Exemplary game features linked with real world activities, such as commercial activity in the real world and/or data collection activity in the real world, will be discussed in more detail below.

At 406, the server serves the parallel reality game, including the game feature linked with the real world activity, to one or more client devices. For instance, the game server 110 serves the parallel reality game, including the game feature linked with real world activity, to one or more client devices 120 over the network 130. At 408, a client device, such as client device 120, receives the game data from the server including data associated with the game feature linked with the real world activity. The client device then presents the parallel reality game, including the game feature linked with the real world activity to a player 410. For instance, a client device 120 can display a visual representation of the virtual world. The virtual world can include the game feature, such as a virtual element located at a specific location in the virtual world to encourage or incentivize player activity in the real world.

At 412, the client device includes receiving data associated with player interaction with the game feature. For instance, a client device 120 can receive data as a result of a player action directed the game feature in the parallel reality game. The data associated with a player interaction can include data associated with a player navigating to a location of a particular virtual element and interacting with the virtual element. As another example, the data associated with a player interaction can include data associated with a player taking actions to complete a game objective or task. As another example, the data associated with a player interaction can include data associated with a player using a power up or other enhanced power provided to a player as part of the game feature linked with the real world activity. At 414, the client device provides the data associated with player interaction with the game feature to the server.

The data associated with the player interaction with the game feature can be received at the server 416. For instance, the game server 110 can receive the data associated with player interaction with the game feature from a client device 120 over the network 130. The server can then modify one or more game elements in the parallel reality game based on the data associated with the player interaction 418. For instance, the game server 110 can update game data stored in the game database 115 associated with a player to record the player's interaction with the game feature linked with the real world activity. In addition, the server can update game data to provide a reward, such as a virtual reward suitable for use in the parallel reality game, for interacting with the game feature linked with the real world activity. The virtual reward can include a virtual item, virtual energy, virtual currency, power up, enhanced power, experience points, or any other suitable reward.

Linking Commercial Activity with a Parallel Reality Game

Figure 5:
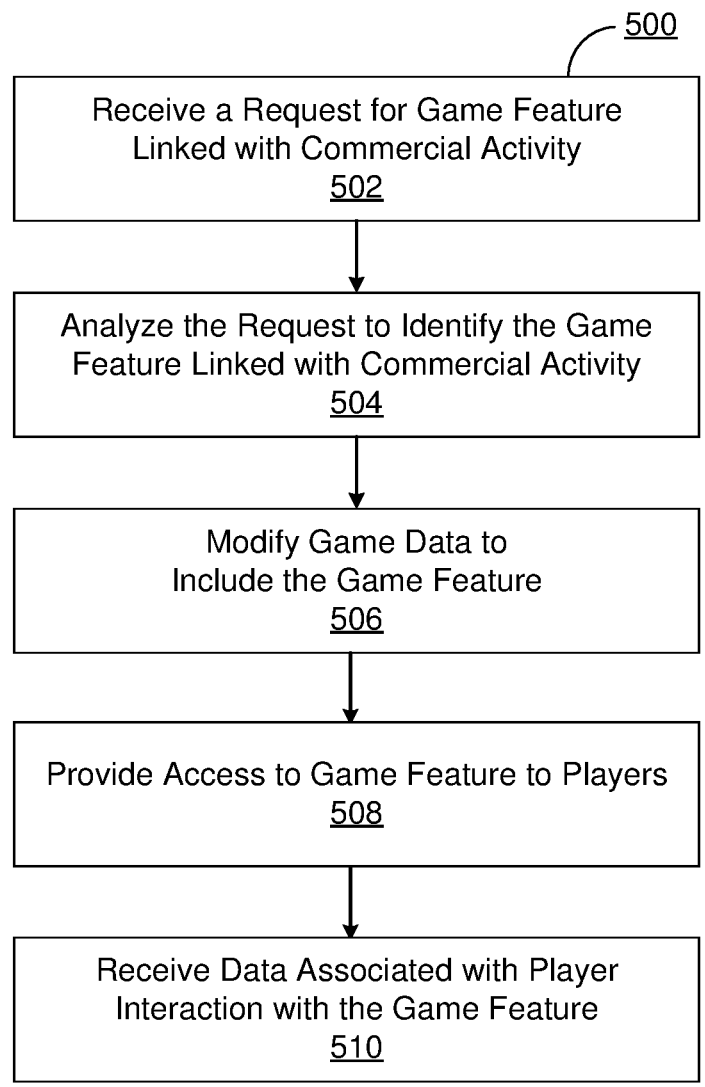
FIG. 5 is a flowchart of a method for linking commercial activity with a parallel reality game, according to one embodiment.

FIG. 5 is a flowchart illustrating one embodiment of a method 500 for linking commercial activity with a parallel reality game. The method 500 can be implemented using any suitable computing device(s), such as the game server 110 of FIG. 1. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. The methods may also include different or additional steps.

In the embodiment shown in FIG. 5, the method 500 begins at 502 with receiving a request for a game feature linked with a commercial activity to be included in the parallel reality game. The request can be for a game feature to be included in the parallel reality game that is linked with a commercial activity in the real world, such as any game feature that can be used to increase or incentivize commercial activity in the real world. For instance, the game feature can be the location of a virtual element in the virtual world. In particular, the game feature can include locating a virtual element in the virtual world at a location corresponding to the location of a commercial activity in the real world to attract potential customers to the location of the commercial activity. Alternatively, the game feature can be linked with the purchase of an object or service in the real world or can include providing a reward to a player that is suitable for use in a commercial transaction in the real world.

According to one aspect of the present disclosure, the request can be received from a remote computing device over a network. For instance, as shown in FIG. 1, sponsors/advertisers 140, businesses 150, or other entities can provide request data to the game server 110 over the network 130. The request data can include a request for a specific or general game feature to be included in the game. The request data can be submitted to the game server using a suitable user interface, such as a web application hosted by the game server 110 or other computing device in communication with the game server 110.

For instance, a sponsor, business or other entity can provide a request to a game server hosting a parallel reality game over a network requesting that certain game features linked with commercial activity in the real world be added to the parallel reality game. The game server can analyze the request and determine whether to add the requested game features to the game. The request can be part of an auction or other suitable format for submitting requests for features. The request can also be provided to a manager, operator, or other individual associated with the parallel reality game. For instance, a sponsor/advertiser 140, business 150, or other entity can interface directly with an individual associated with the parallel reality game in person, over the telephone, by email, or through other communication interface. The individual associated with the parallel reality game can then format the request and provide the request data to a game server, such as game server 110, associated with the parallel reality game.

Once the request for a game feature linked with a commercial activity is received, the request can be analyzed to identify game features linked with the commercial activity as shown at 504 in FIG. 5. For example, the request can be analyzed to identify the number and type of game features included in the request. The requested game features can also be analyzed to determine whether the particular feature is suitable for addition to the parallel reality game during a particular stage or phase of the game.

For example, referring to FIG. 1, the commercial game feature module 114 associated with game server 110 can analyze request data to identify suitable game features to be included in the game. The commercial game feature module 114 can access predetermined criteria and compare the request data to determine if the request data meets the predetermined criteria. The predetermined criteria can be directed to the format, content, or other attributes of the requested game feature or the request data itself.

In a particular implementation, the commercial game feature module 114 can periodically analyze all request data received and select which particular features to include at a particular stage or phase of the parallel reality game. For instance, the commercial game feature module 114 can enforce a limit on the number of game features linked with commercial activity that are included in the parallel reality game. In this manner, the commercial game feature module 114 can manage the inclusion of requested game features in the parallel reality game to prevent any requested game features from interfering with the overall theme, objectives, or other attribute of the parallel reality game.

At 506, the method 500 can include modifying, updating, or adding game data to include the requested game features. For instance, the commercial game feature module 114 can manage game data stored in the game database 115 such that certain requested game features are included in the parallel reality game. Updating the game data can include, for instance, locating virtual elements at specified locations in the virtual world, providing virtual items and/or enhanced powers to specific players, associating tags or brands with virtual elements in the virtual world, and/or implementing a reward engine to distribute rewards suitable for commercial transactions in the real world to players that attain certain achievements or complete specified game objectives in the virtual world.

At 508, access to the parallel reality game with the requested game feature is provided to players of the parallel reality game. For instance, the game server 110 can host or provide access to the parallel reality game with the requested game feature to one or more clients 120 over the network 130. The requested game feature can be provided to all players of the parallel reality game or to selected players of the parallel reality game.

In one implementation, the game feature can be accessed only by those players that are within a predefined radius surrounding the location of the commercial activity linked with the game feature in the real world. For instance, the game server 110 can continuously monitor the position of players of the parallel reality game by receiving position information from clients 120 over the network 130. Based on this position information, the game server 110 can identify players within a predefined radius of the commercial activity. The predefined radius can be set to any magnitude. The game server 110 can provide access to the game feature to only those players within the predefined radius.

At 510 the method 500 can include receiving player interaction associated with game feature. The player interaction can include a suitable interaction with the virtual element located in the virtual world corresponding to a location of commercial activity, the use of an enhanced power or virtual item obtained through commercial activity, or other suitable interaction. Player interaction with the game feature can be monitored and tracked, for instance, by the game server 110. This information can be periodically provided to the sponsor or other entity requesting the game feature to allow the sponsor or other entity to track the value or effectiveness of the game feature in encouraging commercial activity.

Exemplary Game Features Linked with Commercial Activity

Exemplary game features linked with commercial activity in the real world will now be discussed in detail. While exemplary game features will be discussed for purposes of illustration and discussion, those of ordinary skill in the art, using the disclosures provided herein, should understand that the scope of the present disclosure includes any game feature of a parallel reality game that can be used to encourage, increase, or enhance commercial activity in the real world.

One exemplary game feature linked with commercial activity in the real world includes locating a virtual element in the virtual world at a location corresponding to the location of a commercial activity in the real world. The virtual element can be any virtual element associated with the parallel reality game, such as a virtual element associated with a game objective, a virtual item used in the parallel reality game, virtual energy that can be collected as part of the parallel reality game, or other suitable virtual element. One or more game objectives can be associated with the virtual element to encourage players to interact with the virtual element. To interact with the virtual element, players of the parallel reality game will have to travel to the corresponding location of the virtual element in the real world. As a result, locating a virtual element at a location in the virtual world corresponding to the location of commercial activity in the real world can incentivize players to travel to the location of the commercial activity in the real world. This can increase exposure of a business and encourage commercial activity at a particular business or other entity in the real world.

For example, referring to FIG. 1, a sponsor/advertiser 140, business 150, or other entity can provide request data over network 130 to game server 110 associated with a request to locate a virtual element in the virtual world at a location corresponding to the location of a commercial activity, such as a retail or other point of sale location, associated with the sponsor/advertiser 140, business 150, or other entity. The commercial game feature module 114 can analyze the request and update game data stored in the game database 115 to include the virtual element in the virtual world at a location corresponding to the location of commercial activity in the real world. The commercial game feature module 114 can also identify players within a predefined radius of the commercial activity in the real world based on position information provided from clients 120 over the network 130. The game server 110 can then provide access to the parallel reality game with the requested game feature to the identified players. The players having access to the game feature would be encouraged or incentivized to travel to the location of the commercial activity in the real world in order to interact with the virtual element in the virtual world.

Another exemplary game feature linked with commercial activity in the real world can include linking game features, game objectives, or virtual items with the real world purchase of items or services. In particular, the purchase of the real world items/services can provide enhanced powers, access to hidden or locked game elements, virtual items, virtual energy and/or other game features to a player. This can incentivize players to travel to the business or other entity in the real world, purchase the item or service linked with the game feature, and spread word about the item or service among friends and other players of the parallel reality game.

For example, referring to FIG. 1, a sponsor/advertiser 140, business 150 or other entity can send request data to the game server 110 over the network 130 requesting that a real world purchase of an item or service associated with the sponsor/advertiser 140, business 150 or other entity to trigger access to virtual items, enhanced powers, or other enhancement in the virtual world. The commercial game feature module 114 can analyze the request and update game data stored in the game database 115. To obtain or unlock the enhanced powers virtual items, or the enhancements, a player will have to purchase the product or service linked with the enhanced power or item. After the player makes the purchase, the game server 110 can be notified of the purchase.

In one implementation, the player can input a code associated with the purchase of the item or service in a user interface associated with the parallel reality game. The code can be transmitted over the network 130 to the game server 110, which the game server 110 uses to unlock the enhancements for the player. In addition or in the alternative, the sponsor/advertiser 140, business 150 or other entity can notify the game server 110 of the purchase.

Once the game server 110 is notified of the purchase, the game server 110 can modify the game data stored in the game database 115 to provide the player making the real world purchase enhanced powers, virtual items, access to hidden areas, or other game features of value to the player. In this manner, the player is encouraged to participate in commercial activity in the real world in order to advance in the virtual world.

Another exemplary game feature linked with commercial activity in the real world involves the dispensing of rewards suitable for commercial transactions in the real world to players of the parallel reality game for certain achievements or game objectives within the parallel reality game. For instance, the game server 110 can implement a rewards module (e.g., as a sub-module of the commercial same feature module 114) that tracks player progress and/or achievement in the parallel reality game. Upon the achievement of certain goals or the accomplishment of certain game objectives, the rewards module can provide the player with a reward suitable for use in a commercial transaction in the real world.

For example, referring to FIG. 1, a sponsor/advertiser 140, business 150, or other entity can provide request data over the network 130 to the game server requesting that the rewards module distribute a coupon or voucher to players that achieve a predetermined game objective or achievement. The rewards module can monitor player progress in the parallel reality game and provide the coupon or voucher to the player upon completing a game objective or other achievement. The coupon or other voucher can be used by the player as part of a real world commercial transaction. The coupon or other voucher provides a real world item that is of value to both the player and the business or other entity based on actions that occur in the virtual world. As a result, the link between the virtual world and the real world is enhanced such that actions in the virtual world can lead to rewards and increased commercial activity in the real world.

Another exemplary game feature linked with commercial activity in the real world can include the tagging or branding of virtual elements and/or virtual locations in the virtual world with brands/advertisements associated with a business or other entity in the real world. For example, a business or other entity can pay or arrange for certain brands or advertisements to be displayed in connection with virtual elements or virtual locations in the virtual world.

For example, referring to FIG. 1, a sponsor/advertiser 140, business 150, or other entity can provide request data over the network 130 to the game server requesting that particular virtual items in the virtual world be tagged or branded with a logo or other indicia associated with the sponsor/advertiser 140, business, 150, or other entity. The rewards module can analyze the request and update game data such that certain virtual elements are tagged or branded in the virtual world. As players navigate the virtual world by traveling in the real world, players are exposed to the branding and/or advertising associated with tagged or branded virtual items in the virtual world at locations where the brand or advertising may not typically be available or visible in the real world. As a result, the exposure of the business or other entity to players of the parallel reality game can be increased, potentially leading to increased commercial activity in the real world.

Linking Data Collection Activity with Parallel Reality Game

Information in the real world is constantly changing. Collection of data associated with the real world has many applications. For instance, updated data about the real world can be used to enhance or enrich data available online or in other platforms about real world locations, objects, features, and other information. A parallel reality game having a virtual world that parallels the real world can be used to help gather information about the changing real world.

Figure 6:
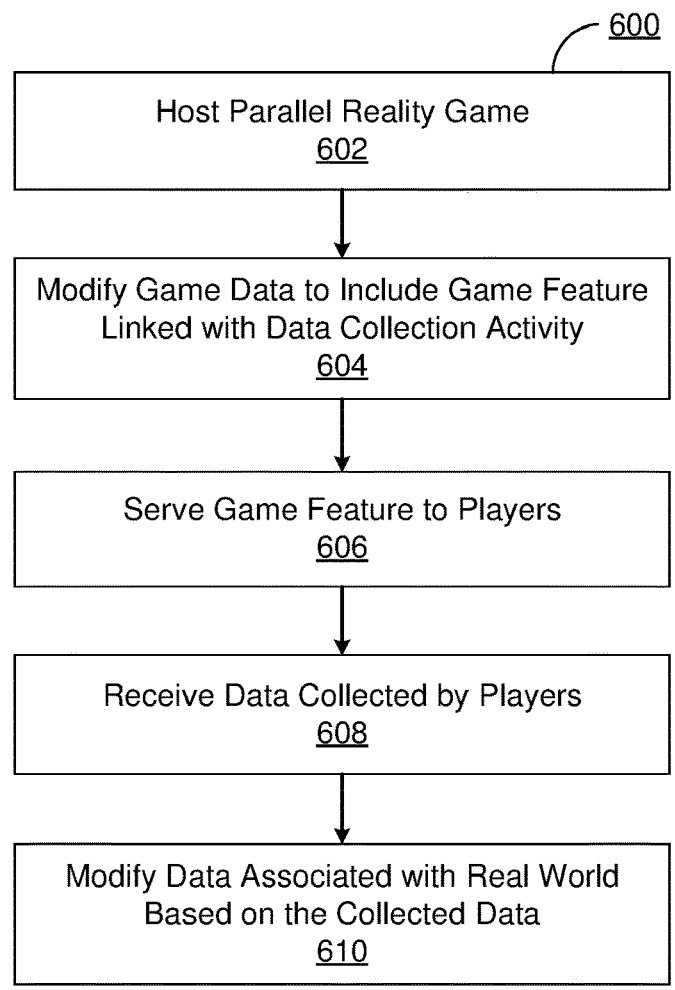
FIG. 6 is a flowchart of a method for linking data collection activity with a parallel reality game, according to one embodiment.

FIG. 6 depicts a flow diagram of a method 600 for linking data collection activity in the real world with a parallel reality game, according to one embodiment. The method 600 can be implemented using any suitable computing device(s), such as the game server 110 of FIG. 1. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. The methods may also include different or additional steps.

In the embodiment shown in FIG. 6, the method 600 begins at 602 with a server hosting the parallel reality game for a plurality of client devices. For instance, the game server 110 can host the parallel reality game for a plurality of client devices 120 over the network 130. Players can access the parallel reality game by communicating with the game server 110 over the network 130 via one or more client devices 120. At 604, the method 600 includes modifying game data associated with the parallel reality game to include a game feature linked with a data collection activity in the real world. For instance, the data collation module 116 can manage game data stored in the game database 115 such that certain game features linked with data collection activity are included in the parallel reality game. A game feature linked with data collection activity in the real world can be any game feature that can directly and/or indirectly lead to the collection of data about real world objects, features, or other information associated with the real world.

An exemplary game feature directly linked with data collection activity can include a game objective or task in the virtual world that involves acquiring information about the real world and providing this information as a condition for completion of the game objective. For example, a game objective associated with a virtual element can require a player to take a photo of a particular landmark, art object, store front, or other feature located in the real world at a location in the real world corresponding to the location of the virtual element. In return for completing the game objective, the player can receive a suitable reward, such as a virtual reward suitable for use in the virtual world or a reward suitable for use in the real world. For instance, the reward can be in the form of virtual items/energy/currency or other virtual elements. The virtual reward can also include enabling some element of game play (e.g. hidden tasks/items, power ups, etc.) that may not be available to other players that do not interact with the game feature.

An exemplary game feature indirectly linked with data collection activity can include placing virtual elements at particular locations in the virtual world so that actions players take to interact with the virtual elements indirectly reveal information about the real world. For instance, one could place a virtual element in a park or hiking area. The game system could then track player movements in the park or hiking area as part of the parallel reality game to allow the player to navigate the virtual world. By tracking the players corresponding movements in the real world as the players navigate the virtual world, information about the location of traversable paths in an the area can be collected. In addition, rate of movement of players in a particular area and/or the altitude of players can be monitored to infer terrain information associated with an area in the real world.

At 606, the method 600 includes serving the parallel reality game including the game feature to one or more client devices used by players of the parallel reality game. For instance, the game server 110 can provide game data associated with the game feature to client devices 120 over the network 130. At 608, the method 600 includes receiving data collected by players pursuant to the data collection activity in the real world. For instance, the game server 110 can receive data collected associated with a real world object pursuant to a game object or task within the parallel reality game. The collected data can include a photograph, a sound recording, textual information, or other data collected by the player, such as the locations of WiFi hotspots or Bluetooth connections.

According to one particular implementation, the collected data can be position information associated with the player tracked by the game server 110 as the player interacts with the game feature. For instance, the game feature linked with the data collection activity can include placement of a virtual element at a specific location in the virtual world. The game server 110 can monitor a user's position in the real world as the user navigates the real world to travel to the corresponding location of the virtual element in the virtual world. This position information can be used to infer characteristics of the real world, such as the location of traversable paths in the real world, terrain information, location of specific object in the real world, and other information.

After receiving the data, the method 600 can include modifying 610 (e.g. updating, enriching, adding to, or other suitable modification) data associated with the real world based on the collected data. For example, the data collected by the player pursuant to the data collection activity can be used to update information about real world objects, features, locations for later access by various platforms, such as online search engines, encyclopedias, geographic information systems (e.g. map information systems, virtual globe information systems), etc.

As multiple players interact with the game feature linked to data collection activity in the real world, the accuracy of the data collected can be increased. For example, if multiple players take a photograph of an art object from multiple different angles, the photographs can be used to generate a three dimensional and/or panoramic view of the art object.

In addition, by knowing a player's location in the real world at the time of the data collection action, position data can be associated with the collected data to further enrich the collected data. For example, if N players provide a photograph of an art object at a geographic position having longitude X, latitude Y and one player provides a photograph of the art object at a different geographic position of longitude Z, latitude W, it can be determined, for instance by the game server 110 or other computing device, that the actual location of the art object is near X, Y and not near Z, W.

One exemplary application of the modified real world data includes updating data associated with the parallel reality game, such as data stored in the game database 115. In particular, data in the game database associated with real world objects linked to virtual features can be enriched based on data collected pursuant to the data collection activity. In this manner, the parallel reality game can be made to more closely conform to changing real world conditions as identified by data collection activities linked to game features in the parallel reality game. By providing a method for enriching game data associated with real world, the link between the real and the virtual world can be improved, providing an enhanced parallel reality for the parallel reality game.

According to another exemplary embodiment of the present disclosure, the parallel reality game can include game features that are linked with data collection activities in the real world. The game features can be directly linked with a data collection activity or indirectly linked with a data collection activity. The data collected by the player as a result of performing the data collection activity can be in the form of a photograph, a sound recording, textual information, or other suitable data (e.g. the location of WiFi hotspots, Bluetooth connections, etc.). The collected information can be sent to the game server which can analyze and use the data to improve data associated with the real world. The improved data can then be made available for access by various platforms, such as search engines, encyclopedias, geographic information systems (e.g. maps services, virtual globe services, etc.) and other platforms.

An exemplary game feature directly linked with data collection activity can include a game objective or task in the virtual world that involves acquiring information about the real world and providing this information as a condition for completion of the game objective. For example, a game objective associated with a virtual element can require a player to take a photograph of a particular landmark, art object, store front, or other feature located in the real world at a location corresponding to the location of a virtual element. In return for completing the game objective, the player can receive a suitable reward, such as a virtual reward suitable for use in the virtual world or a reward suitable for use in the real world. For instance, the reward can be in the form of virtual items/energy/currency or other virtual elements. The reward can also include enabling some element of game play (e.g. hidden tasks/items, power ups, enhanced powers) that may not be available to other players that do not interact with the game feature.

An exemplary game feature indirectly linked with data collection activity can include placing virtual elements at particular locations in the virtual world so that actions players take to interact with the virtual elements indirectly reveal information about the real world. For instance, a virtual object can be located in the virtual world at a location corresponding to a park, hiking area, or other locale. By tracking player movements in the virtual world to navigate to the virtual object, the game system can also track corresponding movements in the real world, providing an indication of the location of traversable paths in an the area.

As multiple players interact with the game feature linked with the data collection activity, the accuracy and extent of collected data associated with the real world can be improved. For example, if multiple people take a picture of an art object or other feature, it is likely that the photographs will be taken from different angles. These different pictures can be assembled to a get a three-dimensional and/or panoramic view (e.g. a street level image) of the art object or other feature that would not be possible with just a single photograph. In addition, by knowing a player's location in the real world at the time of the data collection action, position data can be associated with the collected data to further enrich the collected data.

Validating a Player's Real World Location Using Activity within a Parallel Reality Game As described previously, the operator of a parallel reality game may wish to control access to certain content in the game. For example, a special event might be hosted in specified location (e.g., a park or other public space) in which special game content (e.g., special items, creatures, and other elements) may be available within the parallel reality game to those players eligible to participate. Such an event may provide some players with an incentive to alter the position information reported by positioning device 128 to gaming module 125 to gain access to the special game content without travelling to the real-world location of the event.

Figure 7:
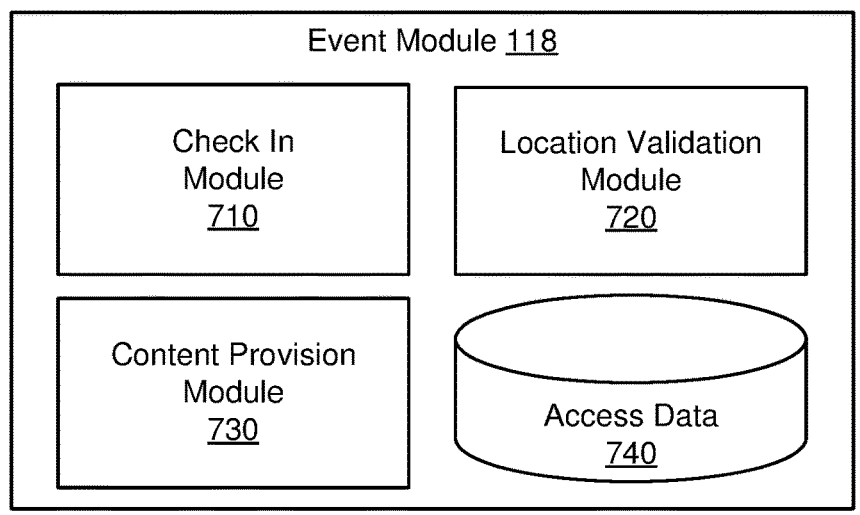
FIG. 7 is a block diagram illustrating the event module of FIG. 1, according to one embodiment.

FIG. 7 illustrates one embodiment of the event module 118 of FIG. 1 that manages and controls access to events in a parallel reality game. In the embodiment shown, the event module 118 includes a check in module 710, a location validation module 720, a content provision module 730, and access data 740. In other embodiments, the event module 118 contains different and/or additional elements. In addition, the functions may be distributed among the elements in a different manner than described. For instance, the event module 118 may be part of the universal game module 112.

The check in module 710 provides a way within the user interface of the parallel reality game for a player to check in to an event. In one embodiment, the check in module updates the game data such that when the positioning device 128 of the player's client 120 indicates the player is at a real-world location that corresponds to a location in the virtual world within a threshold distance from the event, a virtual element is displayed in the virtual world with which the player can interact to initiate the check in process. The virtual element may be a permanent (or semi-permanent) virtual element or a special virtual element that only exists in the virtual world for the duration of the event. Furthermore, other virtual elements in the vicinity of the event may be added, removed, or modified for the duration of the event. For example, virtual elements that usually appear near the location of the event may be removed for the duration of the event to discourage non-participating players (e.g., players who are not checked in) from entering the area and creating over-crowding. Alternatively, some special virtual elements may be provided in the virtual world in proximity to the event for non-participating players to encourage social interactions.

As part of the check in process, the location validation module 720 attempts to validate the player's location. In response to the player initiating the check in process (e.g., by interacting with a specified virtual element), the gaming module 125 on the player's client 120 attempts to obtain a OTP 170. A OTP 170 may be provided to the player in the real world. For example, if the event is at a virtual location corresponding to Grant Park in Chicago, players in such an embodiment travel to Grant Park in the real world, where they obtain—in the real world—a OTP 170. The password may be obtained from a person also located at the specified location, such as by obtaining a ticket or wristband. The code can be transmitted over the network 130 to the game server 110, which confirms that the one-time password is valid, e.g., that it has not previously been redeemed, is valid at that time in that location, etc., and then allows the player to access the virtual reward or features in question. Game server 110 may store lists of valid one-time passwords and their redemption status in game database 115.

Using a OTP 170 may also make the check in process smoother and less disruptive for players. Once a player has obtained their OTP 170, the player may check in using their client 120 without the need for direct interaction with an event organizer or event staff. For example, for an event hosted in a public park, the player may just show up at the park, interact with a virtual element in the game to initiate the check in process, provide the OTP 170, and gain access to the special content for the event. Thus, there may be no need for the event organizer to manually check tickets, making it easier for players to come and go as they please. In one embodiment, the OTP 170 is dynamically generated and is valid only for a short period of time (e.g., one minute). For example, a representation the OTP 170 might be displayed on a screen in a check in area for the event and periodically update. Alternatively, the OTP 70 might be transmitted to the player's client device (e.g., from a Bluetooth beacon).

Figure 8:
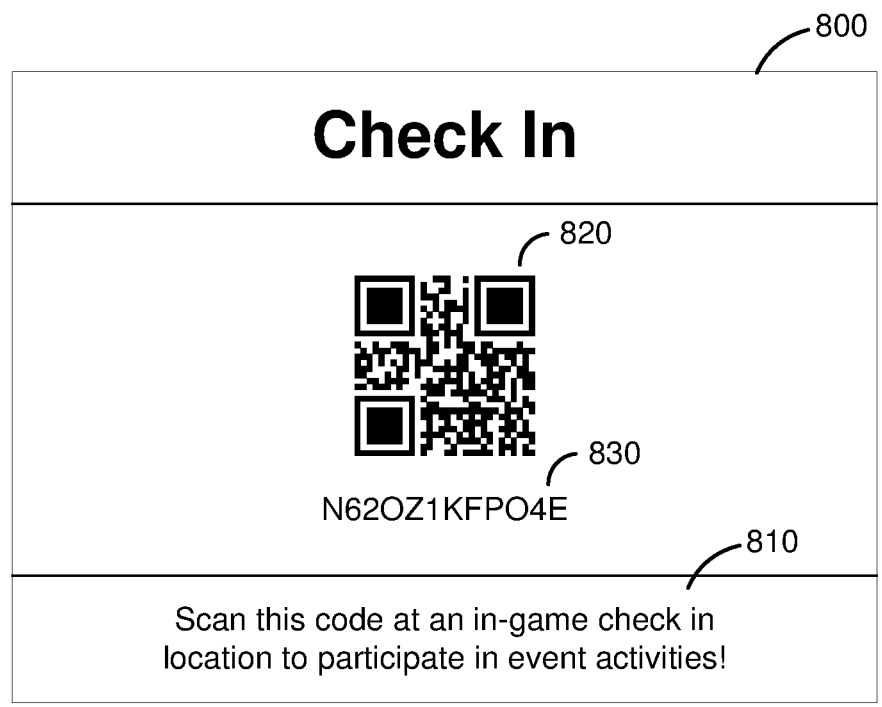
FIG. 8 illustrates an example of a one-time password provided in the real world, according to one embodiment.

FIG. 8 illustrates an example of a ticket 800 providing a one-time password 170. Once the player obtains the ticket 800 in the real world, the player can follow the instructions 810 on the ticket (and/or within the parallel reality game user interface) to input the code. In the embodiment shown, the player may scan the 2D barcode 820 to enter the OTP 170. The ticket 800 also provides the OTP 170 as an alphanumeric code 830 that may be entered manually (e.g., if the player's client 120 has a broken camera or the 2D barcode will otherwise not scan correctly).

In other embodiments, the OTP 170 may be provided to the player in other ways. For example, the OTP 170 may be painted on or carved into an object in the real world or told to the player verbally by an event organizer, etc. Alternatively, the OTP 170 may be encoded in a signal that is detected by the client 120 such as a Bluetooth beacon signal, a particular audio pattern played by a speaker, or the like. The OTP 170 may change periodically to reduce the likelihood of player's not physically present at the location being able to obtain a valid password (e.g., by having it sent to them by another person or a device at the location).

Referring back to FIG. 7, regardless of how it is entered or detected, the client 120 provides the OTP 170 to the validation module 720 for validation of the player's location. In one embodiment, the gaming module 125 of the player's client device 120 sends a request to check in to the game server 110 that includes the OTP 170 and the identity of the player (e.g., a player ID or device ID of the player's client). The access data 740 may include a list of authorized players (e.g., ticket holders) along with a OTP 170 assigned to each. If the player is authorized and the OTP 170 received from the player's client 120 matches the OTP assigned to the player, then the location validation module 720 may authorize the player to access the special content for the event. Alternatively, the OTP 170 may initially not be assigned to a player and the validation module 720 stores an association between the player and the OTP (e.g., in the access data 740) in response to the check in request. In this way, the use of any given OTP 170 can be limited to use by a single player (or a specified number of players, e.g., five, ten, etc.).

In some embodiments, the location validation module 720 may take additional steps to confirm that the player is at the real world location indicated by the position data reported from the positioning device 128 of their client 120. For example, as part of the check in process, the player may be directed to turn on WiFi on their client 120 and connect to a specific wireless network (e.g., one provided by the event organizer) before entering the OTP 170. Thus, the player may only be validated if a valid OTP 170 is submitted from a client 120 connected to the specified network. Similarly, the location validation module 720 may compare an identifier of the cell tower to which the client 120 is connected when the OTP 170 is entered to determine whether it is feasible that the client is located at the real-world location indicated by the position data. Such approaches may increase the confidence level with which the player's location can be validated. This can provide various advantages, including reducing spoofing within the parallel reality game and allowing the game provider to demonstrate to sponsors/advertisers 140 and businesses 150 that players are visiting desired locations due to the game. In some embodiments, the game content available at a given location in the virtual world may depend on whether the player was successfully validated as being at the corresponding real-world location (e.g., because their client 120 is connected to a particular wireless network or cell tower). For example, a location-validated player may see additional or more valuable virtual items than a non-validated player at the same location in the virtual world.

Once a player's location has been validated, the location of the player reported by the positioning device 128 of the player's client 120 may be assumed to be accurate for a given period of time (e.g., an hour, the duration of the event, a day, etc.). Alternatively, the likelihood of a spoofing detection system determining the player's location is spoofed may be reduced. For example, the game server 110 might generally apply a classifier to location data for players that outputs a probability that the location data is spoofed. If the probability exceeds a threshold, the account may be tagged or otherwise labelled as spoofing and further action taken (e.g., further review, issuance of a suspension or ban, etc.). One or more weightings within the classifier or the threshold may be adjusted for a player whose location has been validated for the given period of time.

Assuming that the location validation module 720 authorizes the player to access the event, the content provision module 730 provides the special content for the event for display at the player's client 120. The special content may replace or supplement the default content for the location at which the event is taking place. By requiring the use of a one-time password 730 in the real world in conjunction with position data reported by positioning device 128, the ability of a player to misrepresent or spoof his location is significantly reduced, thus helping to ensure that activity and location in the virtual world is consistent with that in the real world.

Controlled Access to Virtual World Features

In some embodiments, for example as described above, virtual rewards or enhancements may be available in the virtual world for players visiting the analogous location in the real world. As also described above, one-time passwords may be used to confirm a player's real world location actually corresponds to the player's virtual world location.

In one embodiment, an event may be created in the virtual world, in which players are invited to assemble at a particular location, such as Grant Park in Chicago, and for the duration of the event, have access to enhancements, rewards, or other game features not normally present in the virtual world at that location.

Figure 9:
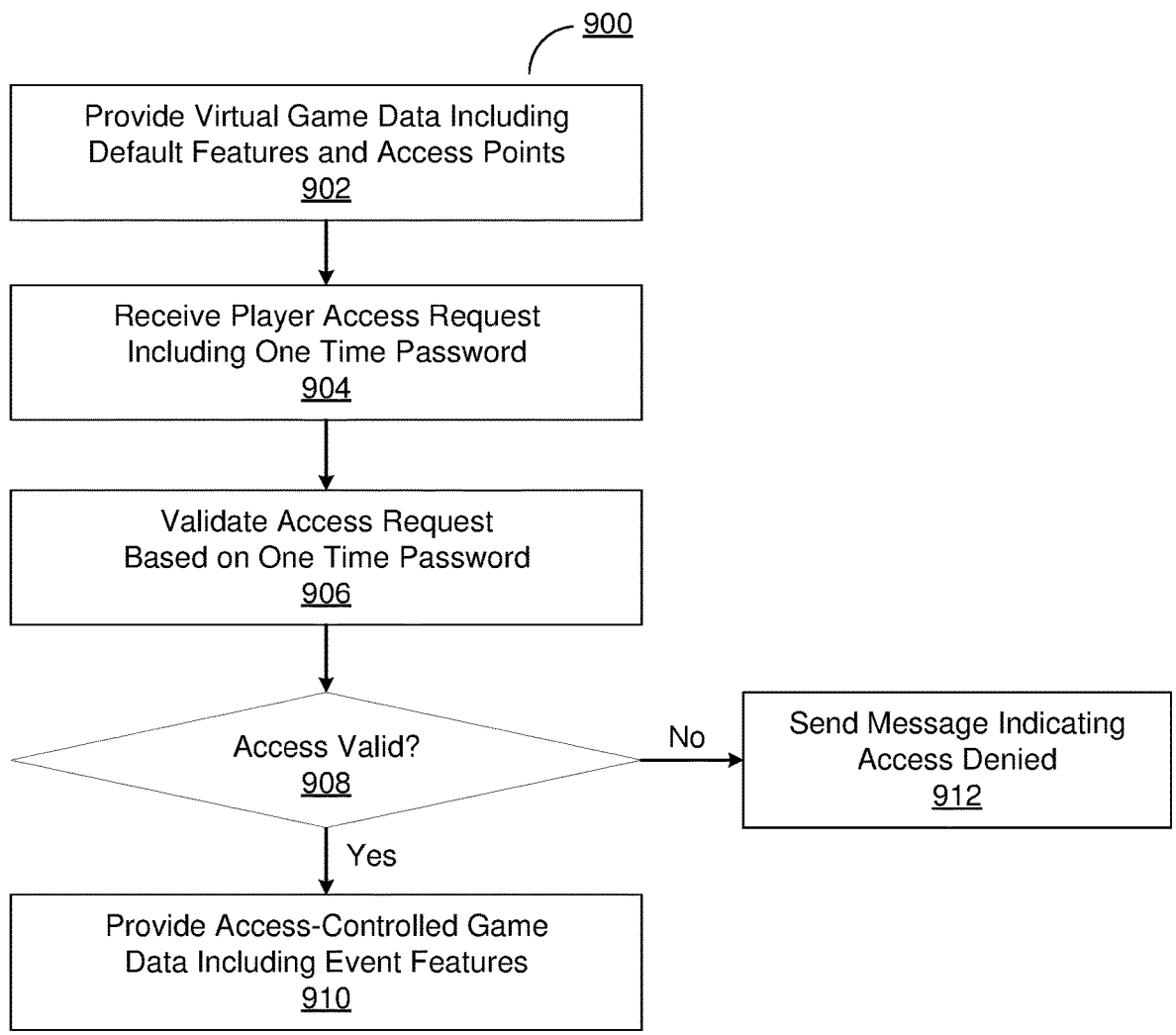
FIG. 9 is a flowchart of a method for enabling controlled access to game content, according to one embodiment.

FIG. 9 illustrates a specific example method 900 of providing access-controlled game data, according to one embodiment. The method 900 can be implemented using any suitable computing device(s), such as the game server 110 of FIG. 1. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. The methods may also include different or additional steps.

When a player is near the controlled access location (e.g., an event) in the real world, game module 125 displays 902 virtual game data on client 120, including the default features normally present at that location in the virtual world. Game module 125 also displays one or more access points in the virtual world, which in one embodiment act as UI features through which a player can gain access to the controlled virtual world features. For example, an access point may be labeled as a "check in" location, or the like.

Next, client 120 receives 904 a request by the player to gain controlled access to the virtual world features. The request in the illustrated embodiment includes a one-type password 730 that the player obtained as described above, for example in the form of a 2D barcode distributed at the real world location.

Client 120 validates 906 the access request by providing the one-time password and position data from positioning device 128 to game server 110. Game server 110 confirms whether the one-time password is valid and whether access should be granted to the player according to the location, password, time, or any other parameters specified in game database 115 for controlling access to the virtual world features. Client 120 receives a validation response from game server 110 and, if 908 the access request is validated, client 120 enables 910 access to the controlled virtual content for the player. If 908 the access is not valid, a message indicating access was denied is sent 912 to the player's client 120 and the player continues to see only the default features present at that location in the virtual world.

In some instances, a player who is denied access may see different features than those that are present by default at the location. For example, a player who is denied access to the event features may see no virtual elements at all in the vicinity of the event for the duration of the event. A player who is denied access may also be flagged for further review to determine whether they player was intentionally trying to gain access improperly and whether further action should be taken (e.g., a warning, suspension, or ban).

Note that in various embodiments, parameters associated in game database 115 with the controlled access virtual world content may specify that the remaining aspects of game data are preserved for players who gain access to the controlled features. For example, achievements, scores, equipment, or other gains, losses, or modifications accomplished by a player while controlled access is enabled may persist after controlled access is no longer available. In an alternative embodiment, player achievements and the like that take place within the controlled access environment do not persist, such that upon exiting or losing access to the controlled access environment, the player's status is returned to the status quo ante. And in some embodiments, a player's status upon entering the controlled environment may be different than his status in the remainder of the virtual world—for example, if the controlled access virtual world environment is a day-long contest for players to try out new game features with or against each other, the implementer may choose to set all players to the same initial starting abilities upon entry to the controlled environment, and then, when the player exits, to return the player to the status the player had just prior to entry, thus leaving no permanent impact upon the player's condition.

In one embodiment, the OTPs 170 are split into groups, thus dividing the players into groups based on the OTP group from which their particular OTP came. The game content provided to each group of players may be different. For example, different groups might see different types of virtual item, have virtual items spawn at different rates, or experience other differences in the rules used to operate the parallel reality game. This may provide a more interesting and varied experience for the players (e.g., different groups may have different objectives and compete with other groups to complete their specified objectives). Variations between groups may also be used by the game provider to test how, on average, players respond to different game scenarios. For example, two groups of players may be presented with different types of virtual items or tasks to determine which generates a greater level of player engagement.

Example Computing System

Figure 10:
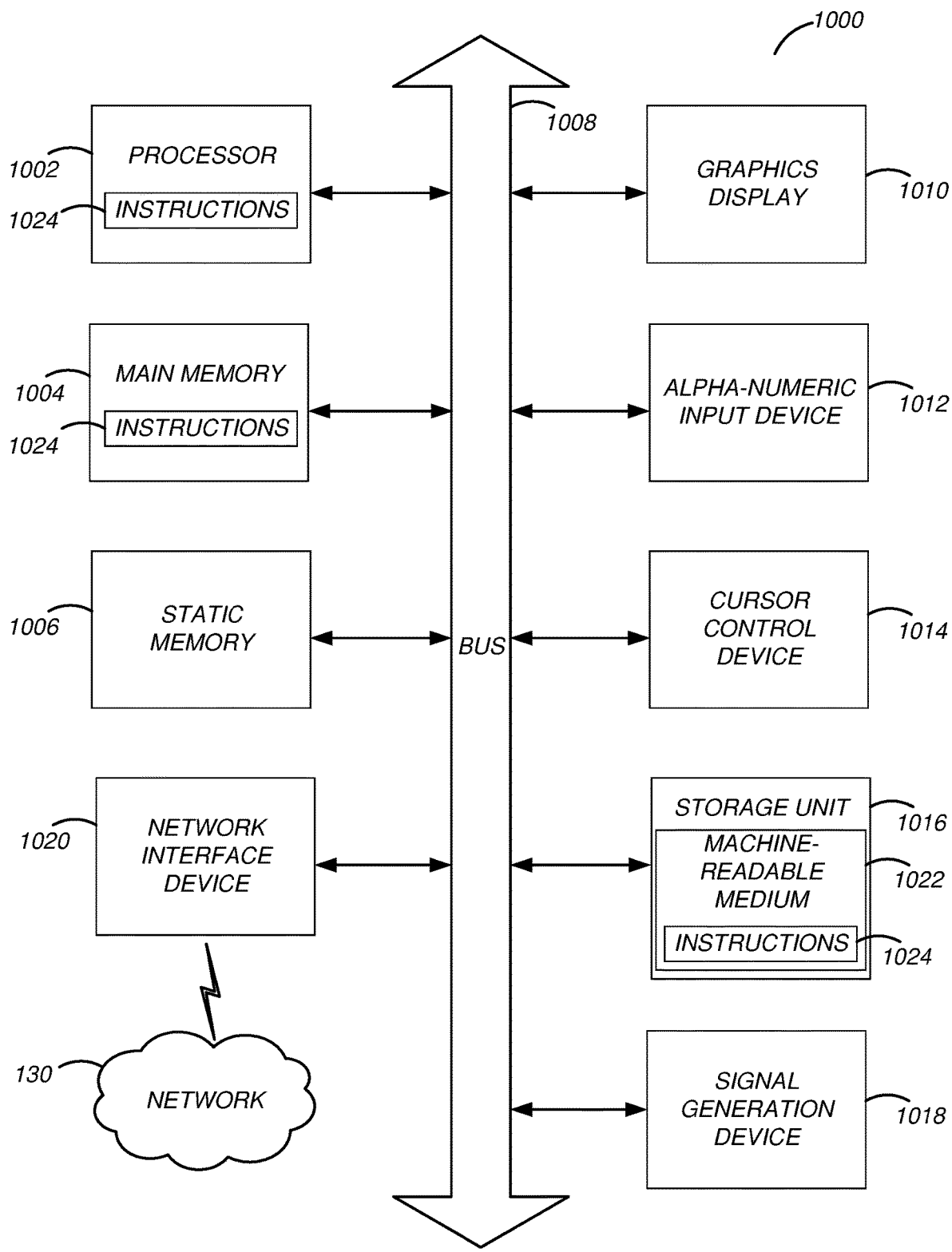
FIG. 10 is a block diagram illustrating an example computer suitable for use in the networked computing environment of FIG. 1, according to one embodiment.

FIG. 10 is a block diagram illustrating components of an example machine able to read instructions from a machine-readable medium and execute them in a processor (or controller). Specifically, FIG. 10 shows a diagrammatic representation of a machine in the example form of a computer system 1000. The computer system 1000 can be used to execute instructions 1024 (e.g., program code or software) for causing the machine to perform any of the methodologies (or processes) described herein. The machine may operate as a standalone device or provide the described functionality in conjunction with other connected (e.g., networked) devices. The machine may operate in the capacity of a server or a client in a server-client network environment, or as a peer machine in a peer-to-peer (or distributed) network environment.

The machine may be a server computer, a client computer, a personal computer (PC), a tablet PC, a smartphone, a network router, or any other machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes one or more processing units (generally one or more processors 1002). The processor 1002 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference herein to a processor 1002 may refer to a single processor or multiple processors. The computer system 1000 also includes a main memory 1004. The computer system may include a storage unit 1016. The processor 1002, memory 1004, and the storage unit 1016 communicate via a bus 1008.

In addition, the computer system 1000 can include a static memory 1006, a display driver 1010 (e.g., to drive a plasma display panel (PDP), a liquid crystal display (LCD), or a projector). The computer system 1000 may also include alphanumeric input device 1012 (e.g., a keyboard), a cursor control device 1014 (e.g., a mouse, a trackball, a joystick, a motion sensor, a touchscreen, or other pointing instrument), a signal generation device 1018 (e.g., a speaker), and a network interface device 1020, which also are configured to communicate via the bus 1008. The computer system 1000 may also include other input devices/sensors, such as a microphone, camera, barometer, gyroscope, accelerometer, etc.

The storage unit 1016 includes a machine-readable medium 1022 on which is stored instructions 1024 (e.g., software) embodying any one or more of the methodologies or functions described herein. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 may be transmitted or received over a network 130 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store the instructions 1024. The term "machine-readable medium" shall also be taken to include any medium that is capable of storing instructions 1024 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for providing gaming content in a parallel-reality game, the method comprising:

receiving, from a client device, a request to access controlled gaming content available during a gaming event in the parallel-reality game, the gaming event scheduled over a time range and located at a real-world location, the request including a real-world location of the client device;

determining whether the real-world location of the client device is in proximity to the real-world location of the gaming event associated with the controlled gaming content, the controlled gaming content being a subset of the provided gaming content in the parallel-reality game that is only accessible to players while at the gaming event who validate one-time passwords;

causing, when the determined real-world location of the client device is in proximity to the real-world location of the gaming event, the client device to display a virtual element in the parallel reality game and near the real-world location, the virtual element requesting entry of a password using an entry method;

receiving, from the client device interacting with the virtual element, a one-time password obtained via the entry method;

validating the one-time password; and providing virtual elements of the controlled gaming content to the client device during the scheduled time range of the event and causing the client device to display the provided virtual elements of the controlled gaming content in the parallel-reality game near the real-world location of the gaming event.

2. The method of claim 1, wherein the one-time password is obtained by one of:
- scanning a two-dimensional barcode by the client device;
- receiving an alphanumeric code by the client device;
- detecting an acoustic signal by the client device; and
- detecting an electromagnetic signal by the client device.

3. The method of claim 1, wherein validating the one-time password comprises:
- identifying a player associated with the client device; and
- querying a database to determine whether the one-time password is valid for the player.

4. The method of claim 3, wherein validating the one-time password further comprises:
- receiving, from a third party system, an indication that the player has participated in a specified commercial activity; and
- storing, in response to the indication that the player has participated in the specified commercial activity, an association in the database between the player and the one-time password, wherein the association indicates the one-time password is valid for the player.

5. The method of claim 1, wherein the controlled gaming content is provided in conjunction with default content, the default content available to all players of the parallel-reality game.

6. A non-transitory computer-readable storage medium storing instructions for providing gaming content in a parallel-reality game that, when executed by a processor, cause the processor to perform operations comprising:
- receiving, from a client device, a request to access controlled gaming content available during a gaming event in the parallel-reality game, the gaming event scheduled over a time range and located at a real-world location, the request including a real-world location of the client device;
- determining whether the real-world location of the client device is in proximity to the real-world location of the gaming event associated with the controlled gaming content, the controlled gaming content being a subset of the provided gaming content in the parallel-reality game that is only accessible to players while at the gaming event who validate one-time passwords;
- causing, when the determined real-world location of the client device is in proximity to the real-world location of the gaming event, the client device to display a virtual element in the parallel reality game and near the real-world location, the virtual element requesting entry of a password using an entry method;
- receiving, from the client device interacting with the virtual element, a one-time password obtained via the entry method;
- validating the one-time password; and
- providing virtual elements of the controlled gaming content to the client device during the scheduled time range of the event and causing the client device to display the provided virtual elements of the controlled gaming content in the parallel-reality game near the real-world location of the gaming event.

7. The storage medium of claim 6, wherein the one-time password is obtained by one of:
- scanning a two-dimensional barcode by the client device;
- receiving an alphanumeric code by the client device;
- detecting an acoustic signal by the client device; and
- detecting an electromagnetic signal by the client device.

8. The storage medium of claim 6, wherein validating the one-time password comprises:
- identifying a player associated with the client device; and
- querying a database to determine whether the one-time password is valid for the player.

9. The storage medium of claim 8, wherein validating the one-time password further comprises:
- receiving, from a third party system, an indication that the player has participated in a specified commercial activity; and
- storing, in response to the indication that the player has participated in the specified commercial activity, an association in the database between the player and the one-time password, wherein the association indicates the one-time password is valid for the player.

10. The storage medium of claim 6, wherein the controlled gaming content is provided in conjunction with default content, the default content available to all players of the parallel-reality game.

11. A computer-implemented method for providing gaming content in a parallel-reality game, the method comprising:
- receiving, from a client device, a request to access controlled gaming content available during a gaming event in the parallel-reality game, the gaming event scheduled over a time range and located at a real-world location, the request including a real-world location of the client device;
- determining whether the real-world location of the client device is in proximity to the real-world location of the gaming event associated with the controlled gaming content, the controlled gaming content being a subset of the provided gaming content in the parallel-reality game that is only accessible to players while at the gaming event who validate one-time passwords;
- causing, when the determined real-world location of the client device is in proximity to the real-world location of the gaming event, the client device to display a virtual element in the parallel reality game and near the real-world location, the virtual element requesting entry of a password using an entry method;
- receiving, from the client device interacting with the virtual element, a one-time password obtained via the entry method;
- validating the one-time password; and
- providing virtual elements of the controlled gaming content to the client device during the scheduled time range of the event and causing the client device to display the provided virtual elements of the controlled gaming content in the parallel-reality game near the real-world location of the gaming event.

12. The method of claim 11, wherein the one-time password is a two-dimensional (2D) barcode, and wherein the verification device scans the 2D barcode presented on a display of the client device.

13. The method of claim 11, wherein the one-time password is an alphanumeric code.

14. The method of claim 11, further comprising:
- receiving, from a third party system, an indication that the player has participated in a specified commercial activity,
- wherein providing the one-time password to the client device is further responsive to the indication that the player has participated in the specified commercial activity.

* * * * *